United States Patent
Li et al.

(10) Patent No.: US 9,774,399 B2
(45) Date of Patent: Sep. 26, 2017

(54) NONLINEAR COMPENSATION METHOD AND APPARATUS AND SYSTEM IN MULTICARRIER OPTICAL COMMUNICATION SYSTEM

(71) Applicant: FUJITSU LIMITED, Kawasaki-shi, Kanagawa (JP)

(72) Inventors: Lei Li, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/987,088

(22) Filed: Jan. 4, 2016

(65) Prior Publication Data

US 2016/0197680 A1    Jul. 7, 2016

(30) Foreign Application Priority Data

Jan. 5, 2015    (CN) .......................... 2015 1 0003764

(51) Int. Cl.
    H04B 10/00    (2013.01)
    H04B 10/58    (2013.01)
    H04B 10/2543  (2013.01)
    H04B 10/69    (2013.01)
(52) U.S. Cl.
    CPC ......... H04B 10/58 (2013.01); H04B 10/2543 (2013.01); H04B 10/697 (2013.01); H04B 10/6972 (2013.01)
(58) Field of Classification Search
    CPC .. H04B 10/58; H04B 10/6972; H04B 10/697; H04B 10/2543
    See application file for complete search history.

(56) References Cited

U.S. PATENT DOCUMENTS

| | | | |
|---|---|---|---|
| 7,596,323 B1 * | 9/2009 | Price ................. | H04B 10/0775 398/140 |
| 2008/0037804 A1 * | 2/2008 | Shmunk ............... | H04R 3/04 381/96 |
| 2013/0108260 A1 * | 5/2013 | Yan .................... | H04B 10/2543 398/25 |

(Continued)

OTHER PUBLICATIONS

Yutaka Kai et al, "Experimental Comparison of Pulse Amplitude Modulation (PAM) and Discrete Multi-tone (DMT) for Short-Reach 400-Gbps Data Communication", thesis No. Th.1.F.3, ECOC2013.

(Continued)

*Primary Examiner* — Danny Leung
(74) *Attorney, Agent, or Firm* — Staas & Halsey LLP

(57) ABSTRACT

A nonlinear compensation method and apparatus and a system in a multicarrier optical communication system where the method includes: determining a coefficient of a linear filter in nonlinear compensation according to an end-to-end channel linear response of the system; determining taps of a nonlinear compensation filter needing to be opened and coefficients of the taps according to a hardware compensation ability of the system and the coefficient of the linear filter; and compensating for a nonlinear damage of the system by using the selected coefficients of the nonlinear compensation filter. With the method, apparatus or the system provided by this application, very good compensation performance may be achieved in a range of power consumption of the multicarrier optical communication system by only opening and using few taps of the compensation filter.

13 Claims, 7 Drawing Sheets

(56) References Cited

U.S. PATENT DOCUMENTS

| | | | |
|---|---|---|---|
| 2013/0243433 A1* | 9/2013 | Yan | H04B 10/2507 398/65 |
| 2016/0036561 A1* | 2/2016 | Stopler | H04L 1/0045 714/776 |
| 2016/0065275 A1* | 3/2016 | Reuven | H04B 7/0413 375/267 |
| 2016/0065329 A1* | 3/2016 | Stopler | H04L 1/0047 714/776 |
| 2016/0099782 A1* | 4/2016 | Kuang | H04B 10/25133 398/136 |
| 2016/0197680 A1* | 7/2016 | Li | H04B 10/58 398/194 |

OTHER PUBLICATIONS

Weizhen Yan et al, "100 Gb/s Optical IM-DD Transmission with 10G-Class Devices Enabled by 65 GSamples/s CMOS DAC Core", thesis No. OM3H.1, OFC2013.

* cited by examiner

NONLINEAR COMPENSATION METHOD AND APPARATUS AND SYSTEM IN MULTICARRIER OPTICAL COMMUNICATION SYSTEM

CROSS-REFERENCE TO RELATED APPLICATIONS

This application claims the benefit of Chinese Application No. 201510003764.0, filed Jan. 5, 2015, the disclosures of all of which are incorporated herein by reference.

BACKGROUND OF THE INVENTION

1. Field

The present disclosure relates to the field of communications, and in particular to a nonlinear compensation method and apparatus and a system in a multicarrier optical communication system.

2. Description of the Related Art

A multicarrier communication system is a communication system based on multicarrier modulation, which is widely used in wireless communication and wired access networks due to its advantages, such as high transmission rate, high spectral efficiency, and anti-multipath frequency domain fading, etc. In a short-haul optical communication application, much attention is paid to a multicarrier communication system, especially a discrete multi-tone (DMT) system based on strength modulation and direct detection due to its simple structure and high transmission rate, which is deemed as one of the leading technologies in short-haul optical communication application scenarios, such as a data center of a next generation (Reference 1). However, in experiments, the performance of the DMT optical communication is constrained by nonlinearity of devices in the system. In order to achieve needed performance, such as 100 Gb/s, the nonlinearity of existing devices must be compensated (Reference 2). In the known art, compensation of nonlinearity is usually achieved by expansion of a Volterra radix, an order of the Volterra radix determining the order of the nonlinearity they may characterize or compensate. A simplest 2th order Volterra radix may be expressed as:

$$y(n) = \sum_{j=0}^{n} \sum_{i=0}^{n} h_2(p_i, p_j) x(n - p_i) x(n - p_j).$$

When this formula is used for nonlinear compensation based on digital signal processing (DSP), $h_2$ is a tap coefficient of a 2th order filter used for compensation, $p_i$ and $p_j$ time flags of the digital signal, and a time range n of $p_i$ and $p_j$ denotes a memory length of the compensated nonlinearity.

It can be seen from this example that in the known art, power consumption of the filter for nonlinear compensation exponentially rises along with the memory length of the nonlinearity it compensates. Hence, a method usually used currently is taking a very small numerical value for n, such as n=3, so as to control the power consumption of the nonlinear compensation. Such a method is feasible when a signal bandwidth is relatively small, for example, a bandwidth of a channel in wireless communication is at a magnitude of 10 MHz. While for high-speed optical communication, as a bandwidth of a signal is at a magnitude of decades of GHz, a nonlinear memory effect of a single device is enhanced, and at the same time, a cascade of linear effect and nonlinear effect between the devices greatly increases the memory length of the nonlinearity of the system. Therefore, for a high-speed optical communication system, there is an assumption that a very short nonlinear memory length performs nonlinear compensation is unable to achieve an expected effect.

Reference 1: Yutaka Kai et al, "Experimental Comparison of Pulse Amplitude Modulation (PAM) and Discrete Multi-tone (DMT) for Short-Reach 400-Gbps Data Communication", thesis No.: Th.1.F.3, ECOC2013; and Reference 2: Weizhen Yan et al, "100 Gb/s Optical IM-DD Transmission with 10G-Class Devices Enabled by 65 GSamples/s CMOS DAC Core", thesis No.: OM3H.1, OFC2013.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

How to obtain an optimal tradeoff between a power consumption budget permitted by hardware and compensation performance is a problem to be solved by this application. In order to solve this problem, this application provides a nonlinear compensation method and apparatus and a system.

According to a first aspect of this application, there is provided a nonlinear compensation controller, including:

a determining unit configured to determine a coefficient of a linear filter in nonlinear compensation according to an end-to-end channel linear response of a multicarrier optical communication system;

a selecting unit configured to determine taps of a nonlinear compensation filter needing to be opened and coefficients of the taps according to a hardware compensation ability of the system and the coefficient of the linear filter; and a transmitting unit configured to transmit the coefficient determined by the determining unit to the linear filter in the nonlinear compensation of the system, and transmit the coefficients of the taps determined by the selecting unit and information on the taps determined as needing to be opened to the nonlinear compensation filter of the system, such that the nonlinear compensation filter opens corresponding taps, and compensates for a nonlinear damage of the system by using the coefficients of the nonlinear compensation filter selected by the selecting unit.

According to a second aspect of this application, there is provided a receiver, including a linear filter for nonlinear compensation and a nonlinear compensation filter; wherein the receiver further includes the nonlinear compensation controller as described above.

According to a third aspect of this application, there is provided a multicarrier optical communication system, including the receiver as described above.

According to a fourth aspect of this application, there is provided a nonlinear compensation method in a multicarrier optical communication system, including:

determining a coefficient of a linear filter in nonlinear compensation according to an end-to-end channel linear response of the system;

determining taps of a nonlinear compensation filter needing to be opened and coefficients of the taps according to a hardware compensation ability of the system and the coefficient of the linear filter; and compensating for a nonlinear damage of the system by using the selected coefficients of the nonlinear compensation filter.

According to another aspect of this application, there is provided a computer-readable program, wherein when a program is executed in a receiver of a multicarrier optical communication system, the program enables a computer to carry out the method as described in the fourth aspect in the receiver.

According to a further aspect of this application, there is provided a storage medium in which a computer-readable program is stored, wherein the computer-readable program enables a computer to carry out the method as described in the fourth aspect in a receiver of a multicarrier optical communication system.

An advantage of the embodiments of the present disclosure exists in that with the method, apparatus or the system provided by this application, very good compensation performance may be achieved in a range of power consumption of the multicarrier optical communication system by only opening and using few taps of the nonlinear compensation filter, and the problem of how to obtain an optimal tradeoff between a power consumption budget permitted by hardware and compensation performance may be solved.

With reference to the following description and drawings, the particular embodiments of the present disclosure are disclosed in detail, and the principles of the present disclosure and the manners of use are indicated. It should be understood that the scope of the embodiments of the present disclosure is not limited thereto. The embodiments of the present disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the exemplary embodiments of the present disclosure, and are used for setting forth the principles of the present disclosure together with the description. It is clear and understood that the accompanying drawings in the following description are some embodiments of the present disclosure only, and a person of ordinary skill in the art may further obtain other drawings according to these accompanying drawings without making an inventive effort. In the drawings.

DETAILED DESCRIPTION OF THE PREFERRED EMBODIMENTS

The foregoing and other features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents falling within the spirit and terms of the appended claims.

Figure 1:
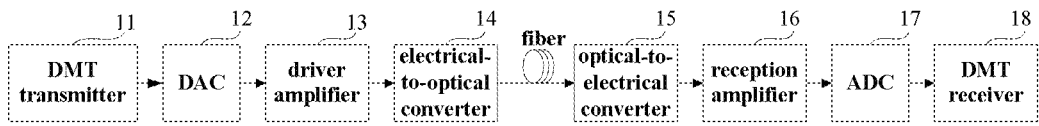
FIG. 1 is a schematic diagram of topology of a high-speed optical communication system based on DMT technology.

FIG. 1 is a schematic diagram of topology of a high-speed optical communication system based on DMT technology. As shown in FIG. 1, a transmission end of the optical communication system includes: a DMT transmitter 11, a digital to analog converter (DAC) 12, a driver amplifier 13, and an electrical-to-optical converter 14, etc. And a receiving end of the optical communication system includes: an optical-to-electrical converter 15, a reception amplifier 16, an analog to digital converter (ADC) 14, and a DMT receiver 18, etc.

Figure 2:
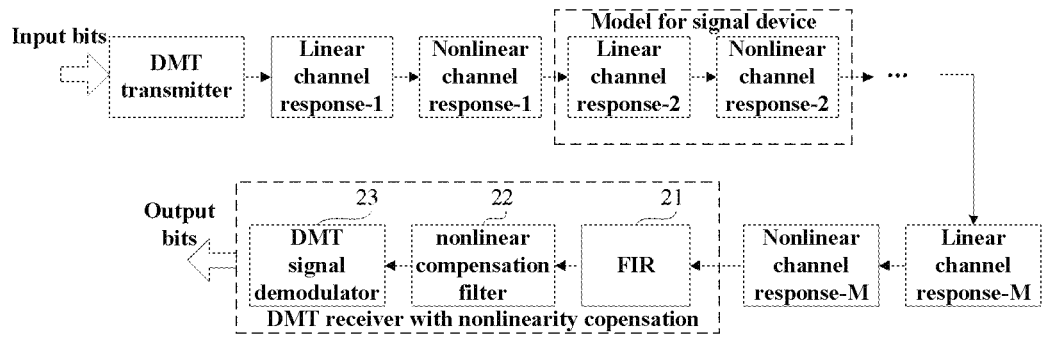
FIG. 2 is a schematic diagram of a structure of a DMT receiver with nonlinear compensation.
Figure 3:
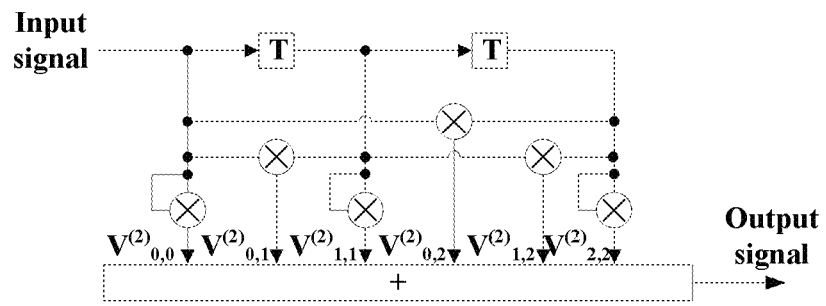
FIG. 3 is a schematic diagram of a structure of an example of a nonlinear compensation filter.

FIG. 2 is a schematic diagram of a structure of the DMT receiver with nonlinear compensation. As shown in FIG. 2, the DMT receiver includes: a linear filter (finite impulse response, FIR) 21, a nonlinear compensation filter 22, and a DMT signal demodulator 23. In this structure, the linear filter 21 and the nonlinear compensation filter 22 constitute a nonlinear compensation part. The nonlinear compensation filter 22 is a high-order filter, and a length of the linear filter 21 and an order and a memory length of the nonlinear compensation filter 22 are fixed for specific hardware, and their coefficients may be determined by using the method and/or apparatus provided by this application. Referring again to FIG. 2, besides the composition of the DMT receiver, FIG. 2 further shows a linear channel response and a nonlinear channel response of a single device in the optical communication system. As shown in FIG. 2, all single devices have linear channel responses and nonlinear channel responses. FIG. 3 is a schematic diagram of a structure of an example of a nonlinear compensation filter with an order of 2 and a memory length of 3.

In this application, following are two basic points of view: first, due to a cascade effect of linearity and nonlinearity of multiple devices, an optimal coefficient of a linear filter (FIR) is related to features of each device in a system, but not to an end-to-end linear response of the whole system; and second, the strength of impact on system performance made by nonlinearity at every moments within the memory length of the nonlinear compensation filter is different. According to the first point, it is proposed in this application to segment monitored end-to-end linear response of the system, and determine the optimal coefficient of the linear filter (FIR) by scanning segment coefficients. According to the second point, it is proposed in this application to perform preliminary selection on nonlinear coefficients according to features of the monitored nonlinear coefficients, then simulate a compensation effect of a combination of the selected nonlinear coefficients according to a power budget of the system, and finally, determine a final combination of the nonlinear compensation filter (taps needing to be opened) and corresponding coefficients (coefficient of the taps) according to a result of simulation.

Figure 4:
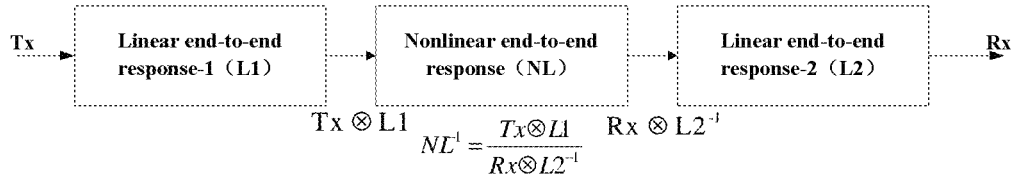
FIG. 4 is a schematic diagram of modeling of the optical communication system of this application.

In this application, it is assumed that the whole optical communication system may be modeled, as shown in FIG. 4. In this example, L1 and L2 denote respectively portions of the end-to-end channel linear response of the system, and a cascade of L1 and L2 constitutes a complete channel linear response. NL denotes an end-to-end nonlinear response of the system, Tx denotes a transmission signal, and Rx denotes a reception signal.

In the modeling, in order to consider a cascade effect of linear responses and nonlinear responses of the devices of the system, the nonlinear response NL is located between L1 and L2. Correspondingly, input of the nonlinear response is a transmission signal of the linear channel characterized by L1, that is, Tx×L1. And at the same time, in order to facilitate estimation of the nonlinear response, output of the nonlinear response NL is denoted by an inverse of a linear response of the reception signal passing L2 in this application, that is, Rx×L2$^{-1}$. According to the input and output of the nonlinear response, the nonlinear response or an inverse of the nonlinear response of the system may be obtained, that is, $$NL = \frac{Rx \otimes L2^{-1}}{Tx \otimes L1} \text{ or } NL^{-1} = \frac{Tx \otimes L1}{Rx \otimes L2^{-1}}. \quad \text{(Formula 1)}$$

It can be seen from the above model that in a case where the transmission signal Tx and the reception signal Rx are known, interaction between the linearity and the nonlinearity in the system may be determined by estimating L1, L2 and NL. Correspondingly, in a case where L2$^{-1}$, NL$^{-1}$ and L1$^{-1}$ are determined, a received signal may be compensated, linear and nonlinear damages of the system may be eliminated, and a correct transmission signal may be obtained. In this application, estimation is performed on the linear and nonlinear responses of the system and corresponding compensation is optimized based on the above model.

In the multicarrier optical communication system using this application, Tx is a training sequence of the system, the training sequence may be a pseudo random sequence used by the system for measuring a signal to noise ratio of a channel, may also be a training sequence redesigned for measuring nonlinearity of the system, and Rx is a signal sequence received by the receiver when the transmitter transmits the training sequence Tx. In the known art, the receiver may estimate an end-to-end channel linear response L of the system according to the received Rx and the Tx stored by itself, and set relevant coefficients of a channel equalization part in the receiver according to the estimated linear response L.

Particular embodiments of this application shall be described below with reference to the accompanying drawings.

Embodiment 1

This application provides a nonlinear compensation controller, which automatically optimizes coefficients of a nonlinear compensation filter according to a structure and power budget of the nonlinear compensation filter of receiver hardware.

Figure 5:
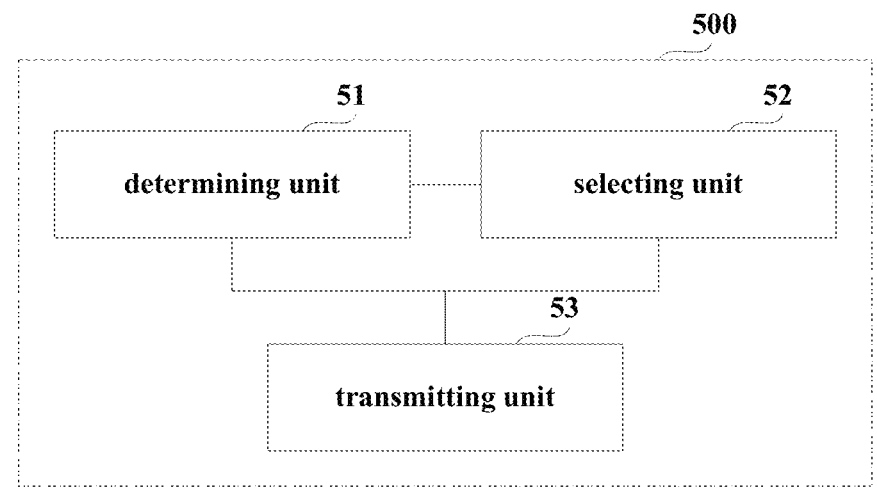
FIG. 5 is a schematic diagram of a structure of the nonlinear compensation controller of this application.
Figure 6:
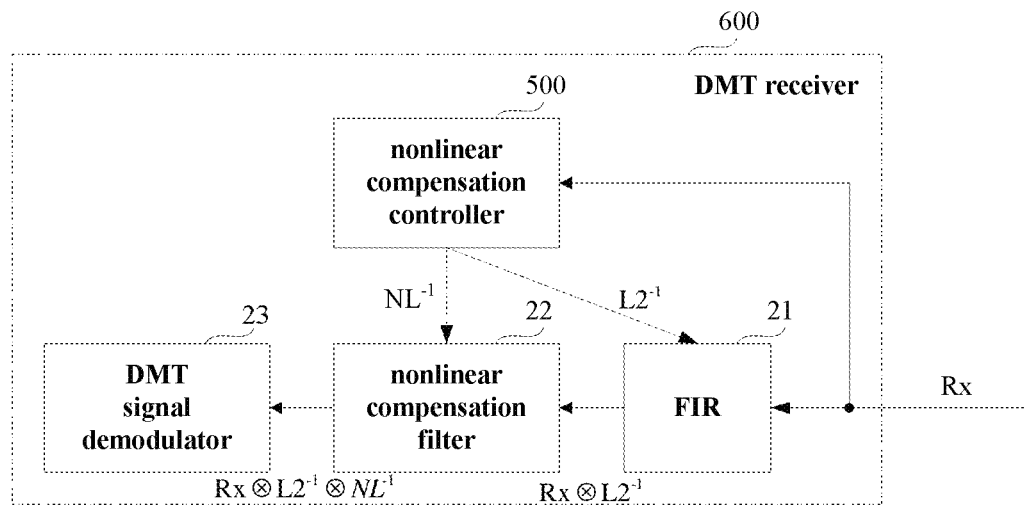
FIG. 6 is a schematic diagram of implementation of the nonlinear compensation controller of this application in a receiver.

FIG. 5 is a schematic diagram of a structure of the nonlinear compensation controller 500, and FIG. 6 is a schematic diagram of implementation of the nonlinear compensation controller 500 in a receiver 600. As shown in FIGS. 5 and 6, the controller 500 includes: a determining unit 51, a selecting unit 52 and a transmitting unit 53. In this embodiment, the determining unit 51 is configured to determine a coefficient of a linear filter in nonlinear compensation according to an end-to-end channel linear response of a multicarrier optical communication system, the selecting unit 52 is configured to determine taps of a nonlinear compensation filter needing to be opened and coefficients of the taps according to a hardware compensation ability of the system and the coefficient of the linear filter, and the transmitting unit 53 is configured to transmit the coefficient determined by the determining unit 51 to the linear filter 21 in the nonlinear compensation of the system, and transmit the coefficients of the taps determined by the selecting unit 52 and information on the taps determined as needing to be opened to the nonlinear compensation filter 22 of the system, such that the nonlinear compensation filter 22 opens the corresponding taps, and compensates for a nonlinear damage of the system by using the coefficients of the nonlinear compensation filter selected by the selecting unit 52.

Figure 7:
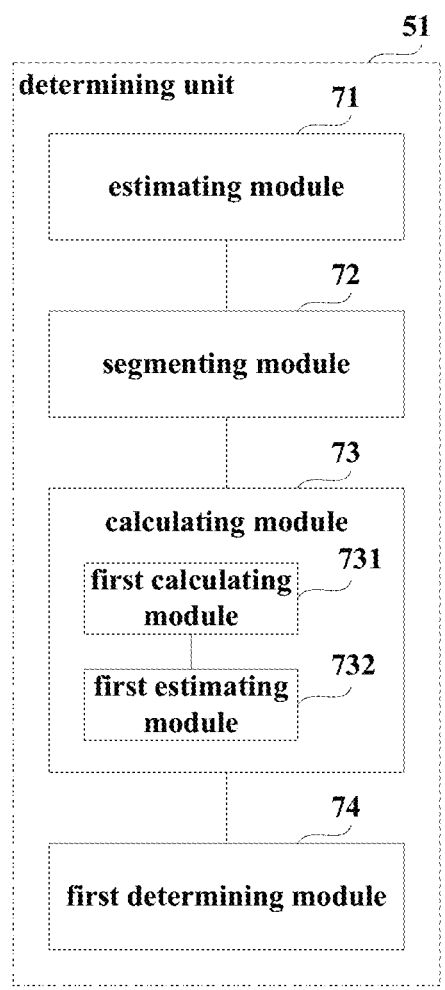
FIG. 7 is a schematic diagram of a structure of the determining unit of the nonlinear compensation controller of this application.

FIG. 7 is a schematic diagram of a structure of an implementation of the determining unit 51 of the controller 500. As shown in FIG. 7, the determining unit 51 includes: an estimating module 71, a segmenting module 72, a calculating module 73 and a first determining module 74.

In this embodiment, the estimating module 71 is configured to estimate the end-to-end channel linear response L of the system according to a received signal sequence and a known training sequence, the segmenting module 72 is configured to traverse and select each value in a predetermined value range of segment coefficients at a predefined step, and segment the end-to-end channel linear response L of the system estimated by the estimating module 71 into a first portion L1 and a second portion L2 by using the selected segment coefficient, the calculating module 73 is configured to calculate compensation performance to which the selected segment coefficient corresponds according to the first portion L1 of the end-to-end channel linear response and an inverse L2$^{-1}$ of the second portion of the end-to-end channel linear response, and the first determining module 74 is configured to take the inverse L2$^{-1}$ of the second portion of the end-to-end channel linear response to which optimal compensation performance corresponds as the coefficient of the linear filter.

In this embodiment, a method of estimating the end-to-end channel linear response L by the estimating module 71 is identical to that in the known art, which shall not be described herein any further.

In this embodiment, in order to segment the end-to-end channel linear response L into two portions, i.e. L1 and L2, a segment coefficient alpha (a) may be predefined; where, L1=L×alpha, L2=L×(1-alpha). As L1 and L2 obtained by using different segment coefficients are different, and different L1 and L2 may result in differences between compensation performance, in this embodiment, multiple alphas may be predefined, and compensation performance to which each alpha corresponds may be calculated by the calculating module 73, so that the first determining module 74 may select an alpha to which optimal compensation performance corresponds there from and takes it as a best alpha, and take the $L2^{-1}$ to which the best alpha corresponds as the coefficient of the linear filter.

In this embodiment, the multiple segment coefficients may be selected from 0-1, for example, a value range and a selected step of the segment coefficients may be predefined. Hence, the segmenting module 72 may traverse and select each value in the value range of the segment coefficients starting from an initial value of the segment coefficients taking the selected step as a basis for selection, so as to use the selected segment coefficient to segment the end-to-end channel linear response L into the first portion L1 and the second portion L2. In this example, the initial value of the segment coefficients may be set as 0, the value range may be set as 0-1, and the step may be set as 0.1, that is, the segmenting module 72 first selects alpha=0 and segments L into L1=0 and L2=L, and then selects alpha=0.1 and segments L into L1=0.1 L and L2=0.9 L, and so on.

In this embodiment, corresponding to L1 and L2 obtained through segmentation according to each alpha selected by the segmenting module 72, the calculating module 73 calculates compensation performance, which is taken as compensation performance to which the selected alpha corresponds. In an implementation, the calculating module 73 includes a first calculating module 731 and a first estimating module 732. In this implementation, the first calculating module 731 is configured to calculate an inverse $NL^{-1}$ of a nonlinear response according to an order of the nonlinear and memory length of each order, the order of the nonlinear and the memory length of each order determining the number of taps of the nonlinear compensation filter, and the first estimating module 732 is configured to estimate compensation performance to which a selected segment coefficient corresponds according to the first portion L1 of the end-to-end channel linear response, the inverse $L2^{-1}$ of the second portion of the end-to-end channel linear response and the inverse $NL^{-1}$ of the nonlinear response.

In this embodiment, the first calculating module 731 may estimate the inverse $NL^{-1}$ of the nonlinear response of the system by using Formula 1 according to L1 and L2 obtained through segmentation according to each segment coefficient selected by the segmenting module 72. The order of the nonlinear and the memory length of each order need to be set in the estimation of $NL^{-1}$. In this application, the setting of the order of the nonlinear and the memory lengths is determined by a hardware structure of the nonlinear compensation filter 22. For example, if the order of the nonlinear compensation filter 22 in the receiver is 2 and a supported memory length is 5 signal sampling points, 15 coefficients listed in the following table need to be estimated in the estimation of $NL^{-1}$, these coefficients corresponding directly to the coefficients of each tap of the nonlinear compensation filter.

|  | \multicolumn{5}{c}{K1} | | | | |
| K2 | −2 | −1 | 0 | 1 | 2 |
| --- | --- | --- | --- | --- | --- |
| −2 | −0.08148 | 0.034034 | 0.019584 | −0.08312 | 0.023995 |
| −1 | S | 0.071047 | 0.038517 | −0.03208 | 0.006021 |
| 0 | S | S | 0.03015 | −0.1004 | 0.034024 |
| 1 | S | S | S | −0.03113 | 0.019128 |
| 2 | S | S | S | S | 0.013625 |

In this embodiment, after the inverse $NL^{-1}$ of the nonlinear response is obtained by the first calculating module 731, the first estimating module 732 may estimate the compensation performance according to L1, $L2^{-1}$ and $NL^{-1}$, which is taken as the compensation performance to which the selected segment coefficient corresponds. For example, the first estimating module 732 may perform simulated compensation and demodulation on a received signal in software according to the structure of the nonlinear compensation filter and the coefficients of taps calculated by the first calculating module 731, so as to obtain maximum compensation performance corresponding to the selected segment coefficient, that is, the received signal is nonlinearly compensated through $L2^{-1}$ and $NL^{-1}$ in turn, and then is conventionally demodulated; wherein, L1 may be incorporated into conventional demodulation.

In this embodiment, corresponding to each segment coefficient, maximum compensation performance is obtained by the calculating module 71. Hence, an optimal segment coefficient and the maximum compensation performance to which it corresponds when the nonlinear compensation filter is completely opened may be obtained by traversing and selecting the segment coefficients by the segmenting module 72, and estimating the compensation performance to which each segment coefficient corresponds by the calculating module 73, and determining the segment coefficient to which the optimal compensation performance corresponds by the first determining module 74.

Figure 8:
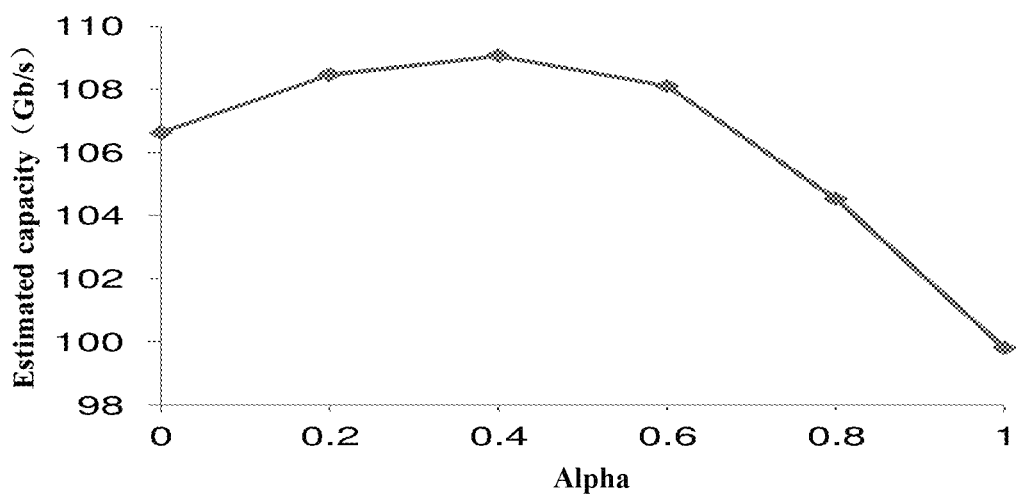
FIG. 8 is a schematic diagram of compensation performance to which different segment coefficients correspond.

FIG. 8 is a schematic diagram of compensation performance to which different segment coefficients correspond proven by experiments. It can be seen from FIG. 8 that the compensation performance may be outstandingly improved by optimizing the segment coefficients.

In this embodiment, after the optimal segment coefficient is determined by the first determining module 74, a coefficient, $L2^{-1}$, of the linear filter 21 at the front end of the nonlinear compensation filter 22 may be determined according to the optimal segment coefficient. Hence, the nonlinear compensation controller 500 may provide the coefficient $L2^{-1}$ of the linear filter to the linear filter 21.

Figure 9:
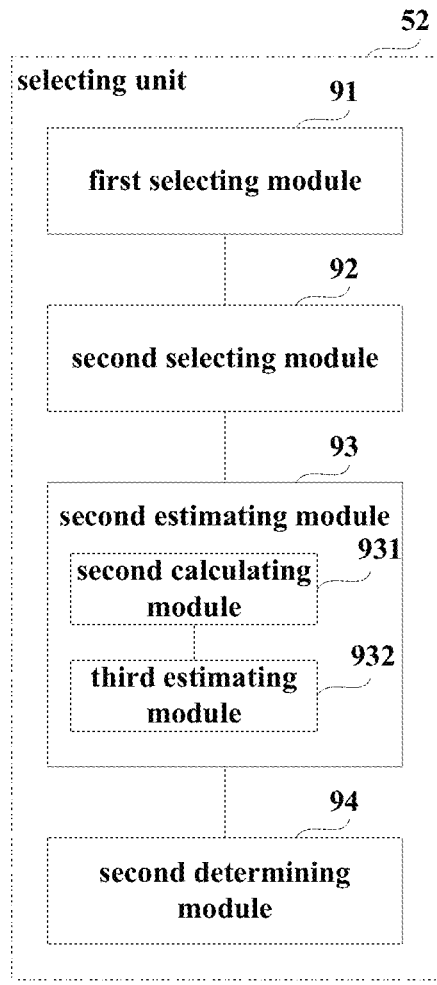
FIG. 9 is a schematic diagram of a structure of the selecting unit of the nonlinear compensation controller of this application.

FIG. 9 is a schematic diagram of a structure of an implementation of the selecting unit 52 of the controller 500. As shown in FIG. 9, the selecting unit 52 includes: a first selecting module 91, a second selecting module 92, a second estimating module 93 and a second determining module 94.

In this implementation, the first selecting module 91 is configured to select a first predefined number of taps from taps of the inverse of the nonlinear response to which the optimal compensation performance corresponds, the second selecting module 92 is configured to select a second predefined number of taps from the first predefined number of taps according to a hardware compensation ability of the system, the second estimating module 93 is configured to estimate new compensation performance for each group of the selected second predefined number of taps, and the second determining module 94 is configured to take the second predefined number of taps to which the optimal new compensation performance corresponds as taps that can be opened by the nonlinear compensation filter, and take the inverse of the nonlinear response to which the optimal new compensation performance corresponds as the coefficients of the second predefined number of taps that can be opened by the nonlinear compensation filter.

In this implementation, the first predefined number of taps may be a first predefined number of taps with absolute values of tap coefficients being relatively large in the taps of the inverse of the nonlinear response to which the optimal compensation performance corresponds, and the second predefined number may be the number of taps of the nonlinear compensation filter that can be opened determined according to power consumption of the system.

In a practical application, when the number of taps of the nonlinear compensation filter is relatively more, for example, the number of taps is greater than 10, if the nonlinear compensation filter is opened completely, a limit of power consumption of the system will be exceeded, and thereby heat dissipation and stability of the transmission system will be affected. Regarding this problem, some taps are reasonably opened and closed in this application through selection by the selecting unit 52, such that optimal compensation performance is obtained within a given power consumption budget.

In this embodiment, in order to reasonably open and close some taps of the nonlinear compensation filter 22, the first selecting module 91 may order H coefficients of the nonlinear compensation filter to which the optimal segment coefficient corresponds according to their absolute values, and select relatively large N there from, $D \leq N \leq H$. In this example, H is also a total number of the taps of the nonlinear compensation filter, i.e. a total number of the taps of the inverse of the nonlinear response to which the optimal compensation performance corresponds, D is the number of the taps that can be opened determined according to the power consumption of the system, and N is the above-described first predefined number, which may be determined according to an empirical value, and may also be determined according to some principles or predetermined policies.

In this embodiment, the second selecting module 92 may select arbitrarily D taps from the N taps selected by the first selecting module 91, the number of D is determined by the power consumption of the system; for example, D taps may only be opened according to the power consumption of the system; otherwise, the limit of the power consumption of the system is exceeded.

In this embodiment, the second estimating module 93 may estimate compensation performance to which the selected D taps correspond according to the D taps selected by the second selecting module 92; wherein, a manner of estimating the compensation performance by the second estimating module 93 is similar to the manner of estimating the compensation performance by the above calculating module 73. In an implementation, the second estimating module 93 includes a second calculating module 931 and a third estimating module 932. In this implementation, the second calculating module 931 is configured to calculate the inverse of the nonlinear response according to the selected second predefined number of taps and a value of the segment coefficient to which the optimal compensation performance corresponds, and the third estimating module 932 is configured to estimate new compensation performance to which the selected second predefined number of taps correspond according to the first portion of the end-to-end channel linear response to which the optimal compensation performance corresponds, the second portion of the end-to-end channel linear response and the inverse of the nonlinear response.

For example, for a selected group of D taps, corresponding L1 and L2 are selected according to a previous selected segment coefficient, coefficients of other taps than the selected D taps are set to be zero, coefficients to which $NL^{-1}$ in the selected D taps corresponds are trained again, and simulated compensation and demodulation are performed on the received signal according to the previously determined coefficient of the linear filter and the trained coefficients of the D taps of the nonlinear compensation filter, so as to estimate the compensation performance when the selected D taps are opened.

Thereafter, the second selecting module 92 may select a new group of combinations of D taps, and the second estimating module 93 continues with estimating compensation performance of the new combinations, until all combinations of D taps in the N taps are traversed.

Hence, the second determining module 94 may select a combination of D taps of optimal compensation performance according to compensation performance to which all combinations of D taps correspond. The D taps in the combination are the taps in the nonlinear compensation filter needing to be opened in hardware, and the coefficients to which the taps correspond are the coefficients to which the optimal compensation performance corresponds, thereby achieving optimality of the compensation performance.

By calculating on the received signal and the known transmission signal stored by itself, the controller of this embodiment obtains the optimal linear filter coefficient in the nonlinear compensation, the optimal tap selection of the nonlinear compensation filter within the limits of the structure and power budget of the nonlinear compensation filter and the corresponding optimal coefficient, thereby the nonlinear damage of the system may be compensated for.

In this application, the cascade of the linear and nonlinear effects of multiple devices in the system is modeled into a cascade of the linear response portion 1 (L1), the nonlinear response (NL) and the linear response portion 2 (L2) by reasonable modeling of the transmission system, optimal L1 and L2 are determined by software modeling, and the response of L2 determines the coefficient of the front-end linear filter in the nonlinear compensation. Finally, the taps needing to be opened in the nonlinear compensation filter and the corresponding tap coefficients are determined by the manner of selecting relatively large values and traversing the combinations. With the above control process, very good compensation performance may be achieved in this application by only opening and using few taps of the nonlinear compensation filter within the range of power consumption of the system. A result of measurement in an experiment of 100 Gb/s transmission of the present disclosure is shown in FIG. 8. It can be seen that by optimizing the front-end linear filter, reasonably selecting the taps and optimizing the tap coefficients, only 6 operational taps are used in this application to achieve a compensation effect that can only be achieved by 231 operational taps in the known art, thereby greatly lowering the power consumption of the system, and making application of the nonlinear compensation in a low-power system possible.

Embodiment 2

An embodiment of the present disclosure further provides a nonlinear compensation method. As principles of the method for solving problems is similar to that of the apparatus of Embodiment 1, the implementation of the apparatus of Embodiment 1 may be referred to for implementation of the method, with identical contents being not going to be described herein any further.

Figure 10:
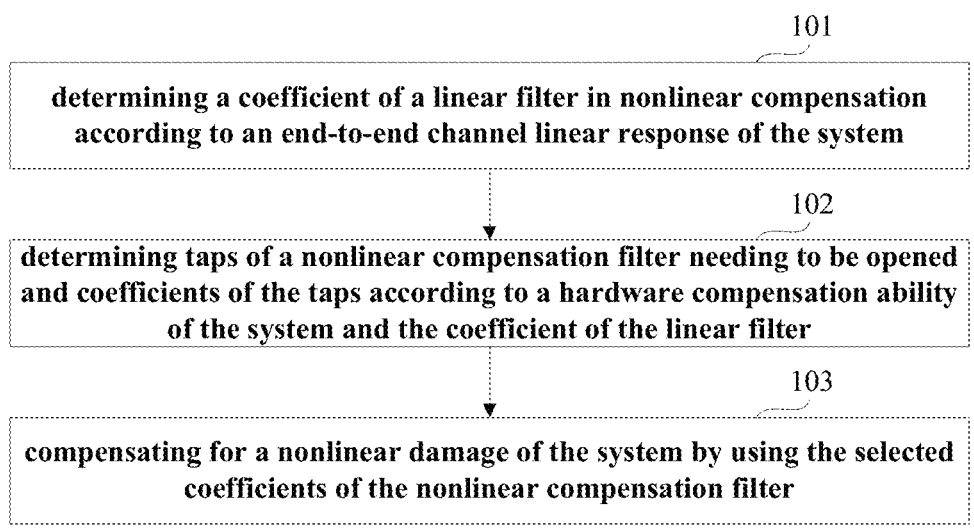
FIG. 10 is a flowchart of the nonlinear compensation method of this application.

FIG. 10 is a flowchart of the nonlinear compensation method of this embodiment, the method being applicable to a multicarrier optical communication system. Referring to FIG. 10, the method includes:

step 101: determining a coefficient of a linear filter in nonlinear compensation according to an end-to-end channel linear response of the system;

step 102: determining taps of a nonlinear compensation filter needing to be opened and coefficients of the taps according to a hardware compensation ability of the system and the coefficient of the linear filter; and step 103: compensating for a nonlinear damage of the system by using the selected coefficients of the nonlinear compensation filter.

Figure 11:
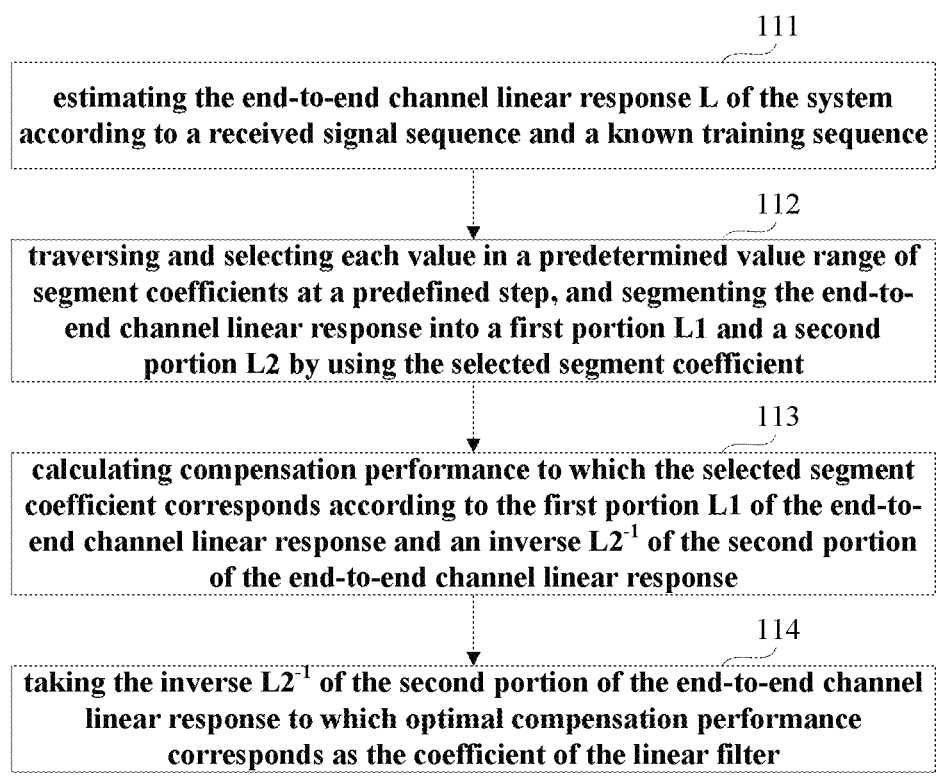
FIG. 11 is a flowchart of step 101 of the method shown in FIG. 10.

In this embodiment, step 101 may be carried out by using a method shown in FIG. 11. Referring to FIG. 11, the method includes:

step 111: estimating the end-to-end channel linear response L of the system according to a received signal sequence and a known training sequence;

step 112: traversing and selecting each value in a predetermined value range of segment coefficients at a predefined step, and segmenting the end-to-end channel linear response into a first portion L1 and a second portion L2 by using the selected segment coefficient;

step 113: calculating compensation performance to which the selected segment coefficient corresponds according to the first portion L1 of the end-to-end channel linear response and an inverse $L2^{-1}$ of the second portion of the end-to-end channel linear response; and step 114: taking the inverse $L2^{-1}$ of the second portion of the end-to-end channel linear response to which optimal compensation performance corresponds as the coefficient of the linear filter.

In an implementation, a segment coefficient is selected in step 112, compensation performance is calculated for the selected segment coefficient in step 113, another segment coefficient is selected turning back to step 112, and compensation performance is calculated for the reselected segment coefficient in step 113, until all segment coefficients are traversed, thereby obtaining compensation performance to which all the segment coefficients correspond respectively. A segment coefficient to which optimal compensation performance corresponds may be determined in step 114, and $L2^{-1}$ to which the segment coefficient corresponds may be taken as the coefficient of the linear filter, the segment coefficient being the segment coefficient to which the optimal compensation performance corresponds.

In this embodiment, in calculating the compensation performance, the inverse of the nonlinear response may be calculated first according to an order of the nonlinear and memory length of each order; and then the compensation performance to which the selected segment coefficient corresponds may be estimated according to the first portion L1 of the end-to-end channel linear response, an inverse $L2^{-1}$ of the second portion of the end-to-end channel linear response and the inverse of the nonlinear response. Details are as described above, and shall not be described herein any further.

Figure 12:
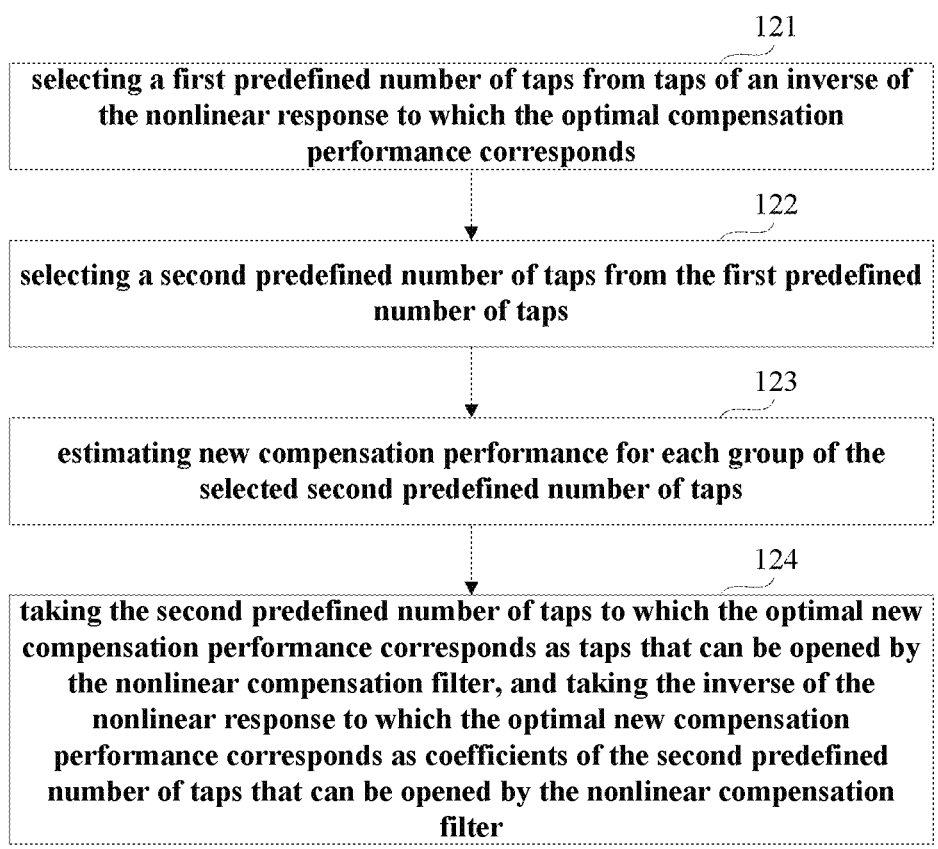
FIG. 12 is a flowchart of step 102 of the method shown in FIG. 10.

In this embodiment, step 102 may be carried out by using a method shown in FIG. 12. Referring to FIG. 12, the method includes:

step 121: selecting a first predefined number of taps from taps of an inverse of the nonlinear response to which the optimal compensation performance corresponds;

step 122: selecting a second predefined number of taps from the first predefined number of taps;

step 123: estimating new compensation performance for each group of the selected second predefined number of taps; and step 124: taking the second predefined number of taps to which the optimal new compensation performance corresponds as taps that can be opened by the nonlinear compensation filter, and taking the inverse of the nonlinear response to which the optimal new compensation performance corresponds as coefficients of the second predefined number of taps that can be opened by the nonlinear compensation filter.

In this embodiment, the first predefined number of taps are first predefined number of taps with absolute values of tap coefficients being relatively large in the taps of the inverse of the nonlinear response to which the optimal compensation performance corresponds, and the second predefined number is the number of taps of the nonlinear compensation filter that can be opened determined according to power consumption of the system.

In an implementation, a second predefined number of taps are arbitrarily selected from the first predefined number of taps in step 122, new compensation performance to which the selected taps correspond is calculated in step 123, then a second predefined number of taps are reselected from the first predefined number of taps again in step 122, and new compensation performance to which the reselected second predefined number of taps correspond is calculated in step 123, until all combinations of a second predefined number of taps are traversed. Hence, a combination of a second predefined number of taps to which optimal new compensation performance corresponds may be determined in step 124, the taps to which the combination corresponds may be opened, and tap coefficients to which the combination corresponds are finally determined coefficients of taps.

In this embodiment, in calculating the new compensation performance, the inverse of the nonlinear response may be calculated first according to the selected second predefined number of taps and the segment coefficients to which the optimal compensation performance corresponds, and then the new compensation performance to which the selected second predefined number of taps correspond is estimated according to the first portion L1 of the end-to-end channel linear response to which the optimal compensation performance corresponds, the second portion L2 of the end-to-end channel linear response and the inverse of the nonlinear response. Details are as described above, and shall not be described herein any further.

With the method of this application, very good compensation performance may be achieved in a range of power consumption of the system by only opening and using few taps of the compensation filter.

Embodiment 3

An embodiment of the present disclosure further provides a receiver, such as DMT receiver. As shown in FIG. 6, the receiver includes a linear filter 21 for nonlinear compensation, a nonlinear compensation filter 22 and a signal demodulator 23. Furthermore, the receiver may include the nonlinear compensation controller 500 described in Embodiment 1. As the nonlinear compensation controller has been described in detail in Embodiment 1, the contents of which are incorporated herein, and shall not be described herein any further.

Figure 13:
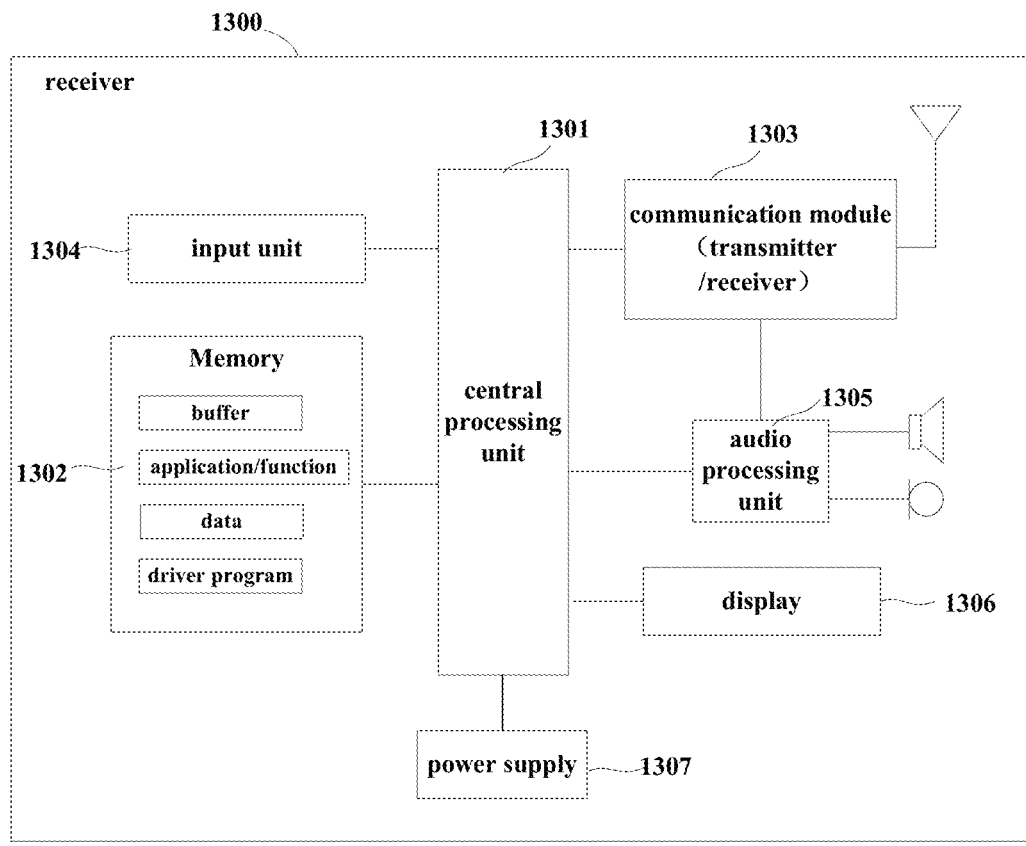
FIG. 13 is a schematic diagram of a structure of the receiver of this application.

FIG. 13 is a schematic diagram of a structure of the receiver of this embodiment. As shown in FIG. 13, the receiver 1300 may include a central processing unit (CPU) 1301 and a memory 1302, the memory 1302 being coupled to the central processing unit 1301. It should be noted that this figure is exemplary only, and other types of structures may be used to supplement or replace this structure for the realization of telecommunications functions or other functions.

In an implementation, functions of the nonlinear compensation controller 500 described in Embodiment 1, the linear filter 21, the nonlinear compensation filter 22 and the signal demodulator 23 may be incorporated into the central processing unit 1301.

In another implementation, the nonlinear compensation controller 500 described in Embodiment 1, the linear filter 21, the nonlinear compensation filter 22 and the signal demodulator 23 and the central processing unit 1301 may be configured separately. For example, the nonlinear compensation controller 500, the linear filter 21, the nonlinear compensation filter 22 and the signal demodulator 23 may be configured as chips connected to the central processing unit 1301, with functions of them being realized under control of the central processing unit 1301.

As shown in FIG. 13, the receiver 1300 may further include a communication module 1303, an input unit 1304, an audio processing unit 1305, a display 1306, and a power supply 1307. It should be noted that the receiver 1300 does not necessarily include all the parts shown in FIG. 13; furthermore, the receiver 1300 may include components not shown in FIG. 13, and the prior art may be referred to.

As shown in FIG. 13, the central processing unit 1301 is sometimes referred to as a controller or manipulating control, and may include a microprocessor or other processor devices and/or logic devices. The central processing unit 1301 receives input and controls operations of every components of the receiver 1300.

In this embodiment, the memory 1302 may be, for example, one or more of a buffer memory, a flash memory, a hard drive, a mobile medium, a volatile memory, a nonvolatile memory, or other suitable devices, which may store predefined or preconfigured information, and may further store a program executing related information. And the central processing unit 1301 may execute the program stored in the memory 1302, so as to realize information storage or processing, etc. Functions of other parts are similar to those of the prior art, which shall not be described herein any further. The parts of the receiver 1300 may be realized by specific hardware, firmware, software, or any combination thereof, without departing from the scope of the present disclosure.

The receiver of the embodiment of this application achieves very good compensation performance in a range of power consumption of the system by only opening and using few taps of the nonlinear filter.

Embodiment 4

Figure 14:
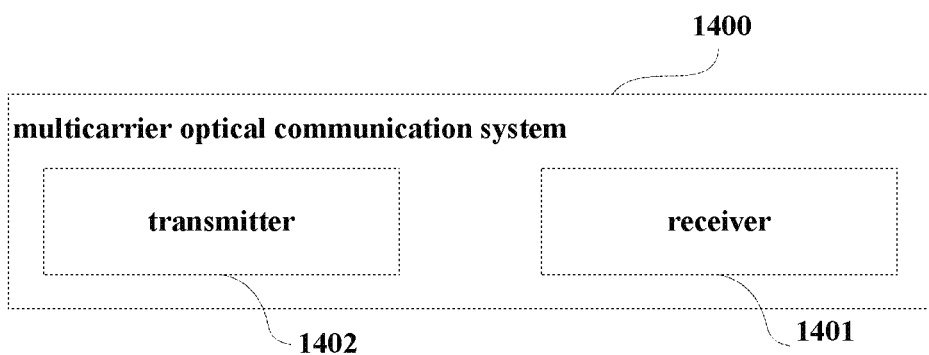
FIG. 14 is a schematic diagram of a structure of the multicarrier optical communication system of this application.

An embodiment of the present disclosure further provides a multicarrier optical communication system. FIG. 14 is a schematic diagram of a structure of the system. As shown in FIG. 14, the system 1400 includes a receiver 1401. In this embodiment, the receiver 1401 may be carried out by the receiver in Embodiment 3, the contents of which being incorporated herein, and being not going be described herein any further. Furthermore, the system may include a transmitter 1402, etc., and the prior art may be referred to.

The multicarrier optical communication system of the embodiment of this application achieves very good compensation performance in a range of power consumption of the system by only opening and using few taps of the nonlinear filter.

An embodiment of the present disclosure further provides a computer-readable program in a non-transitory computer readable storage, wherein when the program is executed in a receiver, the program enables a computer to carry out the method as described in Embodiment 2 in the receiver.

An embodiment of the present disclosure further provides a storage medium in which a computer-readable program is stored, wherein the computer-readable program enables a computer to carry out the method as described in Embodiment 2 in a receiver.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principles of the present disclosure, and such variants and modifications fall within the scope of the present disclosure.

For the implementation of the present disclosure containing the above embodiments, following supplements are further disclosed.

Supplement 1. A nonlinear compensation method in a multicarrier optical communication system, including:

determining a coefficient of a linear filter in nonlinear compensation according to an end-to-end channel linear response of the system;

determining taps of a nonlinear compensation filter needing to be opened and coefficients of the taps according to a hardware compensation ability of the system and the coefficient of the linear filter; and compensating for a nonlinear damage of the system by using the selected coefficients of the nonlinear compensation filter.

Supplement 2. The method according to supplement 1, wherein the determining a coefficient of a linear filter in nonlinear compensation according to an end-to-end channel linear response of the system includes:

estimating the end-to-end channel linear response L of the system according to a received signal sequence and a known training sequence;

traversing and selecting each value in a predetermined value range of segment coefficients at a predefined step, and segmenting the end-to-end channel linear response into a first portion L1 and a second portion L2 by using the selected segment coefficient;

calculating compensation performance to which the selected segment coefficient corresponds according to the first portion L1 of the end-to-end channel linear response and an inverse $L2^{-1}$ of the second portion of the end-to-end channel linear response; and taking an inverse $L2^{-1}$ of the second portion of the end-to-end channel linear response to which optimal compensation performance corresponds as the coefficient of the linear filter.

Supplement 3. The method according to supplement 2, wherein the calculating compensation performance to which the selected segment coefficient corresponds according to the first portion L1 of the end-to-end channel linear response and an inverse $L2^{-1}$ of the second portion of the end-to-end channel linear response includes:

S131: calculating an inverse of a nonlinear response according to an order of nonlinear and memory length of each order; and S132: estimating compensation performance to which the selected segment coefficient corresponds according to the first portion L1 of the end-to-end channel linear response, the inverse $L2^{-1}$ of the second portion of the end-to-end channel linear response and the inverse of the nonlinear response.

Supplement 4. The method according to supplement 2, wherein the determining taps of a nonlinear compensation filter needing to be opened and coefficients of the taps according to a hardware compensation ability of the system and the coefficient of the linear filter includes:

selecting a first predefined number of taps from taps of an inverse of the nonlinear response to which the optimal compensation performance corresponds;

selecting a second predefined number of taps from the first predefined number of taps;

estimating new compensation performance for each group of the selected second predefined number of taps; and taking the second predefined number of taps to which the optimal new compensation performance corresponds as taps that can be opened by the nonlinear compensation filter, and taking an inverse of the nonlinear response to which the optimal new compensation performance corresponds as coefficients of the second predefined number of taps that can be opened by the nonlinear compensation filter.

Supplement 5. The method according to supplement 4, wherein, the first predefined number of taps are first predefined number of taps with absolute values of tap coefficients being relatively large in the taps of the inverse of the nonlinear response to which the optimal compensation performance corresponds.

Supplement 6. The method according to supplement 4, wherein, the second predefined number is the number of taps of the nonlinear compensation filter that can be opened determined according to power consumption of the system.

Supplement 7. The method according to supplement 4, wherein the estimating new compensation performance for each group of the selected second predefined number of taps includes:

calculating the inverse of the nonlinear response according to the selected second predefined number of taps and a value of the segment coefficient to which the optimal compensation performance corresponds; and estimating new compensation performance to which the selected second predefined number of taps correspond according to the first portion L1 of the end-to-end channel linear response to which the optimal compensation performance corresponds, the second portion L2 of the end-to-end channel linear response and the inverse of the nonlinear response.

Supplement 8. A nonlinear compensation controller, including:

a determining unit configured to determine a coefficient of a linear filter in nonlinear compensation according to an end-to-end channel linear response of a multicarrier optical communication system;

a selecting unit configured to determine taps of a nonlinear compensation filter needing to be opened and coefficients of the taps according to a hardware compensation ability of the system and the coefficient of the linear filter; and a transmitting unit configured to transmit the coefficient determined by the determining unit to the linear filter in the nonlinear compensation of the system, and transmit the coefficients of the taps determined by the selecting unit and information on the taps determined as needing to be opened to the nonlinear compensation filter of the system, such that the nonlinear compensation filter opens corresponding taps, and compensates for a nonlinear damage of the system by using the coefficients of the nonlinear compensation filter selected by the selecting unit.

Supplement 9. The controller according to supplement 8, wherein the determining unit includes:

an estimating module configured to estimate the end-to-end channel linear response L of the system according to a received signal sequence and a known training sequence;

a segmenting module configured to traverse and select each value in a predetermined value range of segment coefficients at a predefined step, and segment the end-to-end channel linear response into a first portion and a second portion by using the selected segment coefficient;

a calculating module configured to calculate compensation performance to which the selected segment coefficient corresponds according to the first portion L1 of the end-to-end channel linear response and an inverse L2-1 of the second portion of the end-to-end channel linear response; and a first determining module configured to take the inverse L2-1 of the second portion of the end-to-end channel linear response to which optimal compensation performance corresponds as the coefficient of the linear filter.

Supplement 10. The controller according to supplement 9, wherein the calculating unit includes:

a first calculating module configured to calculate an inverse of a nonlinear response according to an order of nonlinear and memory length of each order; and a first estimating module configured to estimate compensation performance to which the selected segment coefficient corresponds according to the first portion of the end-to-end channel linear response, the inverse of the second portion of the end-to-end channel linear response and the inverse of the nonlinear response.

Supplement 11. The controller according to supplement 9, wherein the selecting unit includes:

a first selecting module configured to select a first predefined number of taps from taps of the inverse of the nonlinear response to which the optimal compensation performance corresponds;

a second selecting module configured to select a second predefined number of taps from the first predefined number of taps;

a second estimating module configured to estimate new compensation performance for each group of the selected second predefined number of taps; and a second determining module configured to take the second predefined number of taps to which the optimal new compensation performance corresponds as taps that can be opened by the nonlinear compensation filter, and take the inverse of the nonlinear response to which the optimal new compensation performance corresponds as coefficients of the second predefined number of taps that can be opened by the nonlinear compensation filter.

Supplement 12. The controller according to supplement 11, wherein, the first predefined number of taps are first predefined number of taps with absolute values of tap coefficients being relatively large in the taps of the inverse of the nonlinear response to which the optimal compensation performance corresponds.

Supplement 13. The controller according to supplement 11, wherein, the second predefined number is the number of taps of the nonlinear compensation filter that can be opened determined according to power consumption of the system.

Supplement 14. The controller according to supplement 11, wherein the second estimating module includes:

a second calculating module configured to calculate the inverse of the nonlinear response according to the selected second predefined number of taps and a value of the segment coefficient to which the optimal compensation performance corresponds; and a third estimating module configured to estimate new compensation performance to which the selected second predefined number of taps correspond according to the first portion of the end-to-end channel linear response to which the optimal compensation performance corresponds, the second portion of the end-to-end channel linear response and the inverse of the nonlinear response.

Supplement 15. A receiver, including a linear filter for nonlinear compensation and a nonlinear compensation filter; wherein the receiver further includes the nonlinear compensation controller as described in any one of supplements 8-14, the nonlinear compensation controller being configured to:

determine a coefficient of the linear filter for nonlinear compensation according to an end-to-end channel linear response of a multicarrier optical communication system;

determine taps of the nonlinear compensation filter needing to be opened and coefficients of the taps according to a hardware compensation ability of the system and the coefficient of the linear filter; and transmit the determined coefficient of the linear filter to the linear filter for nonlinear compensation, and transmit the coefficients of the nonlinear compensation filter and information on the taps needing to be opened to the nonlinear compensation filter, such that the nonlinear compensation filter opens the taps, and compensates for a nonlinear damage of the system by using the coefficients of the nonlinear compensation filter.

Supplement 16. A multicarrier optical communication system, including the receiver as described in supplement 15.

What is claimed is:

1. A nonlinear compensation controller, comprising:
a memory that stores a plurality of instructions; and
a processor coupled to the memory and configured to execute the instructions to:
determine a coefficient of a linear filter in a nonlinear compensation according to an end-to-end channel linear response of a multicarrier optical communication system;
determine taps of a nonlinear compensation filter needing to be opened and coefficients of the taps according to a hardware compensation ability of the system and the coefficient of the linear filter; and
transmit the determined coefficient of the linear filter to the linear filter in the nonlinear compensation of the system, and transmit the determined coefficients of the taps and information on the taps determined as needing to be opened to the nonlinear compensation filter of the system, the nonlinear compensation filter opening corresponding taps, and compensating for a nonlinear damage of the system by using the determined coefficients of the nonlinear compensation filter
wherein the processor is configured to execute the instructions to:
estimate the end-to-end channel linear response L of the system according to a received signal sequence and a known training sequence;
traverse and select each value in a predetermined value range of segment coefficients at a predefined step, and segment the end-to-end channel linear response into a first portion and a second portion by using a selected segment coefficient;
calculate compensation performance to which the selected segment coefficient corresponds according to the first portion of the end-to-end channel linear response and an inverse of the second portion of the end-to-end channel linear response; and
take an inverse of the second portion of the end-to-end channel linear response to which optimal compensation performance corresponds as the coefficient of the linear filter.

2. The nonlinear compensation controller according to claim 1, wherein the processor is configured to execute the instructions to:
calculate an inverse of a nonlinear response according to an order of nonlinearity and memory length of each order; and
estimate compensation performance to which the selected segment coefficient corresponds according to the first portion of the end-to-end channel linear response, the inverse of the second portion of the end-to-end channel linear response and the inverse of the nonlinear response.

3. The nonlinear compensation controller according to claim 1, wherein the processor is configured to execute the instructions to:
select a first predefined number of taps from taps of an inverse of the nonlinear response to which the optimal compensation performance corresponds;
select a second predefined number of taps from the first predefined number of taps according to the hardware compensation ability of the system;
estimate a new optimal compensation performance for each group of the selected second predefined number of taps; and
take the second predefined number of taps to which the new optimal compensation performance corresponds as taps that can be opened by the nonlinear compensation filter, and take an inverse of the nonlinear response to which the new optimal compensation performance corresponds as coefficients of the second predefined number of taps that can be opened by the nonlinear compensation filter.

4. The nonlinear compensation controller according to claim 3, wherein, the first predefined number of taps are first predefined number of taps with absolute values of tap coefficients being large in the taps of the inverse of the nonlinear response to which the new optimal compensation performance corresponds.

5. The nonlinear compensation controller according to claim 3, wherein,
the second predefined number is a number of taps of the nonlinear compensation filter that can be opened determined according to power consumption of the system.

6. The nonlinear compensation controller according to claim 3, wherein the processor is configured to execute the instructions to:
calculate the inverse of the nonlinear response according to the selected second predefined number of taps and a value of the selected segment coefficient to which the new optimal compensation performance corresponds; and
estimate new compensation performance to which the selected second predefined number of taps correspond according to the first portion of the end-to-end channel linear response to which the new optimal compensation performance corresponds, the second portion of the end-to-end channel linear response and the inverse of the nonlinear response.

7. A receiver, comprising a linear filter for nonlinear compensation and a nonlinear compensation filter; wherein the receiver further comprises a nonlinear compensation controller, the nonlinear compensation controller being configured to:
determine a coefficient of the linear filter for nonlinear compensation according to an end-to-end channel linear response of a multicarrier optical communication system;
determine taps of the nonlinear compensation filter needing to be opened and coefficients of the taps according to a hardware compensation ability of the system and the coefficient of the linear filter; and
transmit the coefficient of the linear filter determined to the linear filter for nonlinear compensation, and transmit the coefficients of the taps of the nonlinear compensation filter and information on the taps needing to be opened to the nonlinear compensation filter, the nonlinear compensation filter opening the taps, and compensating for a nonlinear damage of the system by using the coefficients of the nonlinear compensation filter,
wherein the nonlinear compensation controller is configured to:
estimate the end-to-end channel linear response L of the system according to a received signal sequence and a known training sequence;
traverse and select each value in a predetermined value range of segment coefficients at a predefined step and segment the end-to-end channel linear response into a first portion and a second portion by using a selected segment coefficient;
calculate compensation performance to which the selected segment coefficient corresponds according to the first portion of the end-to-end channel linear response and an inverse of the second portion of the end-to-end channel linear response; and
take an inverse of the second portion of the end-to-end channel linear response to which optimal compensation performance corresponds as the coefficient of the linear filter.

8. A nonlinear compensation method in a multicarrier optical communication system, including:
determining a coefficient of a linear filter in nonlinear compensation according to an end-to-end channel linear response of the system;
determining taps of a nonlinear compensation filter needing to be opened and coefficients of the taps according to a hardware compensation ability of the system and the coefficient of the linear filter; and
compensating for a nonlinear damage of the system by using determined coefficients of the nonlinear compensation filter,
wherein the determining a coefficient of a linear filter in nonlinear compensation according to an end-to-end channel linear response of the system includes:
estimating the end-to-end channel linear response L of the system according to a received signal sequence and a known training sequence;
traversing and selecting each value in a predetermined value range of segment coefficients at a predefined step, and segmenting the end-to-end channel linear response L into a first portion L1 and a second portion L2 by using the selected segment coefficient;
calculating compensation performance to which the selected segment coefficient corresponds according to the first portion L1 of the end-to-end channel linear response and an inverse $L2^{-1}$ of the second portion of the end-to-end channel linear response; and
taking an inverse $L2^{-1}$ of the second portion of the end-to-end channel linear response to which optimal compensation performance corresponds as the coefficient of the linear filter.

9. The method according to claim 8, wherein the calculating compensation performance to which the selected segment coefficient corresponds according to the first portion L1 of the end-to-end channel linear response and an inverse $L2^{-1}$ of the second portion of the end-to-end channel linear response includes:
calculating an inverse of a nonlinear response according to an order of nonlinearity and memory length of each order; and
estimating compensation performance to which the selected segment coefficient corresponds according to the first portion L1 of the end-to-end channel linear response, the inverse $L2^{-1}$ of the second portion of the end-to-end channel linear response and the inverse of the nonlinear response.

10. The method according to claim 8, wherein the determining taps of a nonlinear compensation filter needing to be opened and coefficients of the taps according to a hardware compensation ability of the system and the coefficient of the linear filter includes:
selecting a first predefined number of taps from taps of an inverse of the nonlinear response to which the optimal compensation performance corresponds;
selecting a second predefined number of taps from the first predefined number of taps;
estimating optimal new compensation performance for each group of the selected second predefined number of taps; and
taking the second predefined number of taps to which the optimal new compensation performance corresponds as taps that can be opened by the nonlinear compensation filter, and taking an inverse of the nonlinear response to which the optimal new compensation performance corresponds as coefficients of the second predefined number of taps that can be opened by the nonlinear compensation filter.

11. The method according to claim 10, wherein,
the first predefined number of taps are first predefined number of taps with absolute values of tap coefficients being large in the taps of the inverse of the nonlinear response to which the optimal compensation performance corresponds.

12. The method according to claim 10, wherein,
the second predefined number is a number of taps of the nonlinear compensation filter that can be opened determined according to power consumption of the system.

13. The method according to claim 10, wherein the estimating new compensation performance for each group of the selected second predefined number of taps includes:
calculating the inverse of the nonlinear response according to the selected second predefined number of taps and a value of the segment coefficient to which the optimal compensation performance corresponds; and
estimating new compensation performance to which the selected second predefined number of taps correspond according to the first portion L1 of the end-to-end channel linear response to which the optimal compensation performance corresponds, the second portion L2 of the end-to-end channel linear response and the inverse of the nonlinear response.

* * * * *